UNITED STATES PATENT OFFICE.

JULES HENRI LAVOLLAY AND GUSTAVE EUGÈNE BOURGOIN, OF PARIS, FRANCE.

ELECTROLYTIC PROCESS OF PURIFYING CRUDE SPIRITS.

SPECIFICATION forming part of Letters Patent No. 674,780, dated May 21, 1901.

Application filed June 8, 1900. Serial No. 19,496. (No specimens.)

*To all whom it may concern:*

Be it known that we, JULES HENRI LAVOLLAY, chemical engineer, and GUSTAVE EUGÈNE BOURGOIN, mechanical engineer, of 3 Rue Froment, Paris, in the Republic of France, have invented an Electrolytic Process of Purifying Crude Spirits, of which the following is a specification.

The invention relates to a new process for purifying crude spirits in order to obtain neutral rectified spirit.

The process consists in treating the crude spirits until neutralized with a manganate of an alkaline-earth metal—for example, manganate of calcium or any other insoluble manganate—in the presence of an electric current. Insoluble manganates alone have no effect on the spirits. On the other hand, an electric current alone has only a very inadequate effect, as numerous experiments have proved. In this process, however, the manganates react under influence of the electric current and a very strong oxidizing action results, while the nascent hydrogen evolved by electrolysis reduces the aldehydes, and thereby increases the yield of alcohol. In fact, by means of the electric current a continuous mutual reaction takes place between the organic matter on the one hand and the manganates on the other hand.

The final result of the process is thus: first, the elimination of bad flavor and improved products my means of the combined action of the manganates and electricity, and, second, the reduction of the aldehydes by means of electrolytic hydrogen.

The above produces the following industrial results: first, improved quality of the spirits obtained, and, second, increase in the yield of the resultant spirits.

The process is carried out in electrolyzers of any suitable form without porous partitions. The metallic electrodes may be of zinc, this substance being the cheapest to employ.

The quantities of manganate to be employed vary from fifty to one hundred grams per hectoliter, according to the nature of the liquid treated.

The current density may vary between one and five amperes per square meter. The voltage employed will of course vary with the total resistance of the liquid used.

The duration of the process varies from ten to twenty minutes. During the whole of this time a continual agitation must be maintained in order that the manganate may always be in suspension.

On the termination of the process the solid matter should be removed by filtration.

Having thus described our invention, we declare that what we claim is—

1. The process for purifying crude spirits which consists in mixing with such spirits an insoluble manganate in powdered form and passing an electric current through said mixture while maintaining said powder in suspension.

2. The process for purifying crude spirits which consists in mixing with such spirits a manganate of an alkali-earth metal in powdered form and passing an electric current through said mixture while maintaining said powder in suspension.

3. The process for purifying crude spirits which consists in mixing with such spirits manganate of calcium in a powdered form and passing an electric current through said mixture while maintaining said powder in suspension.

In witness whereof we have hereunto signed our names, this 25th day of May, 1900, in the presence of two subscribing witnesses.

JULES HENRI LAVOLLAY.
GUSTAVE EUGÈNE BOURGOIN.

Witnesses:
 AUGUSTE FOURNOL,
 PAUL FOURNOL.